United States Patent [19]

Hasegawa et al.

[11] Patent Number: 5,318,724
[45] Date of Patent: Jun. 7, 1994

[54] ANTISTATIC COATING COMPOSITION

[75] Inventors: Minoru Hasegawa; Akihiko Yamanaka; Hiroshi Kumai; Masayo Hosoda, all of Tokyo, Japan

[73] Assignee: Colcoat Co., Ltd., Tokyo, Japan

[21] Appl. No.: 39,825

[22] Filed: Mar. 30, 1993

[30] Foreign Application Priority Data

Apr. 1, 1992 [JP] Japan .................. 4-105226

[51] Int. Cl.$^5$ .................. H01B 1/00; H01B 1/06; H01B 1/08
[52] U.S. Cl. .................. 252/518; 252/521; 106/1.25
[58] Field of Search .............. 262/518, 521; 106/1.25; 427/165

[56] References Cited

U.S. PATENT DOCUMENTS

| | | | |
|---|---|---|---|
| 3,114,668 | 12/1963 | Guiles | 161/116 |
| 3,326,715 | 6/1967 | Twells | 117/124 |
| 3,635,751 | 1/1972 | Long, III et al. | 117/94 |
| 3,940,511 | 2/1976 | Deal et al. | 427/165 |
| 4,169,735 | 10/1979 | Boberski et al. | 106/84 |
| 4,560,581 | 12/1985 | Deal et al. | 427/64 |
| 4,563,612 | 1/1986 | Deal et al. | 313/478 |
| 4,898,509 | 8/1975 | Brown, Jr. et al. | 313/478 |
| 4,944,706 | 7/1990 | Tojo | 445/8 |
| 4,965,096 | 10/1990 | Deal et al. | 427/165 |
| 5,122,709 | 6/1992 | Kawamura et al. | 313/479 |

FOREIGN PATENT DOCUMENTS

| | | |
|---|---|---|
| 226902 | 4/1963 | Fed. Rep. of Germany . |
| 2662022 | 11/1991 | France . |
| 1-139164 | 5/1989 | Japan . |

*Primary Examiner*—Paul Lieberman
*Assistant Examiner*—M. Kopec
*Attorney, Agent, or Firm*—Armstrong, Westerman, Hattori, McLeland & Naughton

[57] ABSTRACT

There is provided a coating material which can be used on the surfaces of various base materials and can form a non-glare coating film having excellent antistatic properties and surface hardness and having no glare. The coating composition comprising a mixed aqueous-dispersion sol, the coating composition comprising (i) an aqueous-dispersion type sol of an electroconductive oxide(s) of at least one metal selected from the group consisting of tin, antimony and indium, and (ii) an aqueous silica sol prepared by dispersing or hydrolyzing lithium silicate and/or alkyl silicate in water solvent.

4 Claims, No Drawings

ANTISTATIC COATING COMPOSITION

The present invention relates to an antistatic coating composition comprising a mixed aqueous-dispersion type sol which can form a non-glare coating film having excellent antistatic properties and surface hardness and having no glare.

More particularly, the present invention relates to an antistatic coating composition comprising a mixed aqueous-dispersion type sol which makes it possible to form a non-glare coating film having excellent antistatic properties and surface hardness and having no glare, by coating the surface of the faceplate of a cathode-ray tube, or the like with the mixed aqueous sol comprising an aqueous-dispersion type sol of at least one electroconductive metal oxide and an aqueous silica sol; and a process for producing said composition.

In recent years, computers have come to be often used on all occasions, owing to the development of office automation (OA). With the increase of the frequency in their use, operations through terminal equipments of CRT (cathode-ray tube) have come to be often carried out.

In the above operations through CRT, the following problems, for example, are caused. The image plane becomes difficult to see on the screen, owing to the specular reflection of external light, and the deposition of dust and an electric shock are caused by the generation of static electricity by application of a high voltage at the time of switching or during CRT operation.

In general, for removing the above problems, external light is subjected to diffused reflection (scattered reflection) by forming a fine uneven coating film (an antidazzle coating film) having an excellent antistatic ability on the surface of the faceplate of a cathode-ray tube.

For example, for improving the performance characteristics of a cathode-ray tube, there have been made several proposals in which a silica coating method is employed.

(i) In U.S. Pat. Nos. 4,563,612 and 3,940,511, for imparting desired antistatic properties to CRT, the faceplate of a cathode-ray tube is coated, by spraying or the like, with a coating composition comprising a silicate material and an inorganic metal compound, specifically, a lithium-stabilized silica sol and a compound of a metal selected from the group consisting of platinum, palladium, tin and gold. However, when said coating composition is applied in practice, the coated surface becomes very dim, the resolution is deteriorated, and glare is generated. Moreover, the application is effective merely to such an extent that static electricity is not accumulated. Therefore, no satisfactory resistivity value can be attained, namely, the value attained is $10^{10}$ $\Omega$.

(ii) U.S. Patent No. 4,965,096 has proposed a modification of the formation process of an antistatic and anti-reflective coating film disclosed in U.S. Pat. No. 4,563,612. The points of the modification are the shortening of the treatment time and the reduction of the cost, but a coating film formed by the modification is equal in characteristics to that formed according to the above U.S. Pat. No. 4,563,612.

As described above, in the materials according to U.S. Pat. Nos. 4,563,612 and 4,965,096, i.e., the materials for an antistatic and anti-reflective coating film which are composed mainly of a lithium-stabilized silica sol, there is used as another component a metal element, more specifically, a metal element such as platinum, palladium, tin or gold, preferably a water-soluble metal compound such as palladium sulfate, tin sulfate, tin chloride or gold chloride, in an amount of 0.005 to 0.02 wt%. The metal component is used because of its function of surface sensitization in electroless plating.

As described above, there have been proposed various cathode-ray tubes which are intended to possess improved antistatic properties and non-glare properties according to a silica coating method, but a cathode-ray tube having satisfactory characteristics has not yet been obtained. In detail, the various cathode-ray tubes are not satisfactory enough with respect to not only the formation of a coating film having a fine, uneven and rough surface, antistatic properties, and non-glare properties, but also the performance characteristics of a coating film, such as corrosion resistance and the prevention of emission slump.

In order to remove the above-mentioned defects of the silica coating method, the present inventors earnestly investigated a method for combining a colloidal solution obtained by dispersion of at least one electrically conductive oxide in water (hereinafter referred to "aqueous-dispersion type sol of an electroconductive metal oxide(s)") with an aqueous silica sol prepared from lithium silicate or alkyl silicate, and bringing out characteristics of these two components to the best advantage.

In detail, since lithium silicate and alkyl silicate form a vitreous coating film having a polysiloxane bond (-Si-O-Si-) on the surfaces of various base materials, the present inventors investigated a method for improving the antistatic ability and surface hardness of a coating film and reducing glare [sparkle caused by interference at the time of light emission at a silica-coated surface, phosphor dots (a mosaic structure) or a shadow mask], by combining an aqueous-dispersion type sol of an electroconductive metal oxide(s) with lithium silicate and/or alkyl silicate.

Consequently, the present inventors found that when there is used as coating material a mixed aqueous-dispersion type sol comprising an aqueous-dispersion type sol of an electrically conductive oxide(s) of at least one metal constituent selected from the group consisting of tin (Sn), antimony (Sb) and indium (In) which is obtained by dispersing ultrafine particles of the metal oxide(s) in water, and at least one silicate selected from the group consisting of lithium silicates and alkyl silicates, there can be obtained a coating film which is much superior in antistatic properties and surface hardness to conventional coating films and is free from glare. Thus, the present invention has been accomplished.

An outline of the present invention is given below. The present invention relates to an antistatic coating composition comprising a mixed aqueous-dispersion type sol, said coating composition comprising (i) an aqueous-dispersion type sol of an electrically conductive oxide(s) of at least one metal selected from the group consisting of tin, antimony and indium, and (ii) an aqueous silica sol prepared by dispersing or hydrolyzing lithium silicate and/or alkyl silicate in water solvent; and a process for producing said coating composition.

The technical constitution of the present invention is explained below in detail.

The present invention provides a coating composition excellent in antistatic ability, etc. which, as described above, comprises a mixed aqueous-dispersion type sol comprising an aqueous-dispersion type sol of an electrically conductive oxide(s),of at least one specific metal component dispersed in water and an aqueous silica sol prepared from the above-mentioned silicate(s), namely, which comprises a sol in which colloidal particles are uniformly dispersed in water medium to form a composition.

As described above, the mixed aqueous-dispersion type sol according to the present invention is based on the finding that an aqueous-dispersion type sol obtained by dispersing at least one electrically conductive oxide in water under specified conditions forms a coating film having an excellent antistatic ability, and that an aqueous silica sol obtained by dispersing or hydrolyzing at least one silicate in water solvent can form a coating film having an excellent surface hardness.

The aqueous-dispersion type sol of the above-mentioned electrically conductive oxide(s) is prepared, for example, in the following manner.

The aqueous-dispersion type sol of the electrically conductive oxide(s) used in the present invention is obtained by dispersing ultrafine particles of 1 $\mu$m or less, preferably 0.1 $\mu$m or less, of the above-mentioned electrically conductive oxide(s) by adjusting the pH of water, i.e., a dispersion medium. The dispersion can be sufficiently achieved when the pH is 4 or higher, preferably about 5 to about 6.

The solid content of the aqueous-dispersion type sol of the aforesaid electrically conductive oxide(s) used in the present invention is preferably adjusted to 35% or less in order to prevent aggregation and precipitation. When the solid content is low, aggregation and precipitation hardly occur. When the particle size is too large (more than 1 $\mu$m), aggregation and precipitation occur. Consequently, no uniform coating film is formed so that neither antistatic effect nor glare-preventing effect can be obtained.

The aforesaid aqueous silica sol is prepared, for example, in the following manner.

The aqueous silica sol used in the present invention may be prepared in a conventional manner.

In detail, to prepare the aqueous silica sol from at least one silicate selected from the group consisting of lithium silicates ($SiO_2/Li_2O = 3$ to 6 by mole) and alkyl silicates [$Si(OC_nH_{2n+1})_4$ wherein n=1 to 4, preferably 1 or 2], the following is sufficient. In the case of dispersion, the silicate(s) is merely dispersed in water solvent. In the case of hydrolysis, the silicate(s) is added in an amount required for attaining a desired solid content, in the presence or absence of a catalyst, and hydrolyzed. As a usual method for the hydrolysis, there is a method of adding water to a mixture of a solvent and the silicate(s) in an amount required for attaining a desired conversion by hydrolysis, in the presence of an acid or alkali catalyst, and hydrolyzing the silicate(s).

In the present invention, as to the proportion of the aqueous-dispersion type sol of oxide(s) of the aforesaid metal constituent(s) to the aqueous silica sol, the higher the proportion of the metal oxide(s), the larger the antistatic effect but the lower the adhesive properties to a substrate. Therefore, the proportion of the aqueous-dispersion type sol to the aqueous silica sol is determined so that there can be obtained a dispersion which can form a uniform coating film and is free from aggregation and precipitation. Usually, the using proportion of the metal oxide(s) is approximately 10 to 200 parts by weight, preferably 15 to 100 parts by weight, per 100 parts by weight of silica obtainable from the aqueous silica sol.

The mixed aqueous-dispersion type sol according to the present invention, i.e., the mixed aqueous-dispersion type sol of the electrically conductive oxide(s) of the aforesaid metal constituent(s) and the aforesaid silicate(s) which is prepared in the form of the above-mentioned aqueous dispersion, comprises colloidal particles uniformly dispersed in water medium without aggregation and precipitation. The colloidal particles are formed by dispersion or hydrolysis of the oxide(s) of the aforesaid metal constituent(s) (here abbreviated as M) and the aforesaid silicate(s) in water, have basic structures of —M—O—M—, —Si—O—Si—, —Si—O—M—, etc., and contain a —OH group. In the mixed aqueous-dispersion type sol of the electrically conductive metal oxide(s) and the silicate(s) prepared in the form of the above-mentioned aqueous dispersion according to the present invention, the dispersed particles are formed by uniform dispersion of each of the oxide(s) and the silicate(s) or uniform dispersion of these two components by their interaction, and hence have excellent film-forming properties.

The aforesaid mixed aqueous-dispersion type sol according to the present invention can be used on the surfaces of various base materials, is excellent in antistatic properties and surface hardness, and can form a glare-free coating film. Therefore, it is useful for application purposes which require these characteristics. The application purposes include use in a cathode-ray tube (CRT).

The above use in a cathode-ray tube is explained below.

When the surface of the faceplate of a cathode-ray tube is coated with the mixed aqueous-dispersion type sol according to the present invention by means of, for example, a spray coater, and the sol is heat-treated in a low temperature range of approximately 100° to 150° C., the above-mentioned colloidal particles interact with one another to grow into a stable coating film. At this stage, as described in detail in the example given hereinafter, the coating film exhibits such a very high antistatic ability that its resistivity value is $1 \times 10^9 - 10^8$ $\Omega$. Needless to say, when non-glare treatment is carried out so as to give very small concavities and convexities, there can be obtained a cathode-ray tube which is excellent in antistatic properties and surface hardness and is free from glare.

As explained above, a coating film obtained from the mixed aqueous-dispersion type sol according to the present invention is much superior in antistatic ability to conventional coating films.

The aforesaid aqueous silica sol used in the present invention has heretofore been used for non-glare treatment and can form a coating film having an excellent surface hardness.

In addition, in the present invention, a sufficient surface hardness can be attained by adjusting the particle size of the electroconductive metal oxide(s) in the aqueous dispersion to 1 $\mu$m or less. Moreover, glare caused by interference at the time of light emission at a silica coat surface, phosphor dots (a mosaic structure) and a shadow mask is reduced by controlling the particle size of the electrically conductive oxide(s).

The present invention is illustrated in further detail with the following examples which should not be construed as limiting the scope of the invention.

REFERENTIAL EXAMPLE 1

An Example of Preparation of a Mixed Aqueous-dispersion Type Sol

In a 500-ml flask equipped with a stirrer, thermometer and reflux condenser were placed 179 g of ion-exchanged water and 5 g of lithium silicate (Lithium Polysilicates #48, mfd. by E. I. Du Pont de Nemours & Co.), and stirred to obtain a homogeneous mixture. The temperature of the mixture was maintained at 30° C., after which 2.6 g of methyl silicate (Methyl Silicate 39, mfd. by Colcoat Co., Ltd.) was added, and hydrolysis was carried out. The solution thus obtained was subjected to reaction at 30° C. for 4 hours. Then, 13.4 g of an electrically conductive tin oxide aqueous-dispersion type sol (SN-38F, mfd. by Ishihara Sangyo Kaisha, Ltd.) was added dropwise with stirring to the solution obtained from ion-exchanged water, the lithium silicate and the methyl silicate in the aforesaid flask. The resulting solution was subjected to reaction at 30° C. for 1 hour to prepare an antistatic coating composition.

REFERENTIAL EXAMPLE 2

An Example of Preparation of a Mixed Aqueous-dispersion Type Sol

In a 500-ml flask equipped with a stirrer, thermometer and reflux condenser were placed 148.3 g of ion-exchanged water, 2.6 g of lithium silicate (LSS-45, mfd. by Nissan Chemical Industries, Ltd.) and 0.3 g of LiOH.$H_2O$ (mfd. by Kanto Chemical Co., Inc.), and stirred to obtain a homogeneous mixture. The temperature of the mixture was maintained at 30° C., after which 5.4 g of ethyl silicate (Ethyl Silicate 28, mfd. by Colcoat Co., Ltd.) was added and hydrolysis was carried out. The solution thus obtained was subjected to reaction at 30° C. for 4 hours. Then, 13.4 g of an electroconductive tin oxide aqueous-dispersion type sol (SN-38F, mfd. by Ishihara Sangyo Kaisha, Ltd.) and 30 g of ion-exchanged water were added with stirring to the solution in the aforesaid flask. The resulting solution was subjected to reaction at 30° C. for 1 hour to prepare an antistatic coating composition.

APPLICATION EXAMPLE

An Example of Employment of the Coating Fluid in CRT

Using the coating fluid prepared in the Reference Examples 1 and 2 and a continuous spray coater, non-glare treatment was carried out so as to form very small concavities and convexities on the faceplate of the Braun tube of a TV set with a 14-in. or 15-in. wide screen. The temperature at preheating of the Braun tube was 60° C., and the conditions of heat-treating after the coating were 150° C. for 1 hour or 170° C. for 30 minutes.

The resulting samples were evaluated as follows:

(1) Gloss value (surface gloss)

Gloss value was measured by use of a gloss tester (VG-2P-D3, mfd. by Nihon Denshoku Ind. Co., Ltd.) according to JIS Z 8741 while Gs was adjusted to 60°. The values were measured at 9 places on each sample and the average thereof was represented by "initial gloss value" shown in Table.

(2) Resistivity (antistatic property)

Resistivity was measured by use of a resistivity tester (Stack TR-3, mfd. by Tokyo Electronics Co., Ltd.) under the conditions of 23±5° C., 55±5% R.H. The values were measured at 9 places on each sample and the average thereof was represented by "resistivity" shown in Table.

(3) Rubbing test with eraser (surface hardness)

Reciprocative abrasion tests were effected using a rubbing tester equipped with an eraser (No. 50-30, mfd. by Lion Office Products Corp.) under a load of 1 kg. And then the ratio ($\Delta G_{200}$) of the gloss value measured after 200 times of the reciprocation to the initial gloss value was calculated. Moreover, state of the surface was observed by the eye.

(4) Surface glare

The Braun tube was lighted and the degree of glare on the surface of the tube was observed by the eye.

TABLE

| | | Initial gloss value | Resistivity ($\Omega$) | $\Delta G_{200}$ | Sparkle |
|---|---|---|---|---|---|
| Reference Example 1 | | 58.3 | $5.6 \times 10^8$ | 11 (no scratch) | Not observed |
| Reference Example 2 | ① | 68.7 | $9.7 \times 10^8$ | 6 (no scratch) | Not observed |
| | ② | 60.2 | $1.7 \times 10^8$ | 9 (no scratch) | Not observed |

Note:
①: The width of the screen was 14 inch and the heat treatment was effected at 150° C. for 1 hour.
②: The width of the screen was 15 inch and the heat treatment was effected at 170° C. for 30 minutes.

The mixed aqueous-dispersion type sol comprising a specified electroconductive metal oxide(s) and a silicate(s) according to the present invention can be used as a coating material (a film-forming material) on the surfaces of various substrate materials and can form a coating film having such excellent characteristics that it is excellent in antistatic properties and surface hardness and is free from glare (sparkle).

For example, when a water-soluble electrically conductive metal compound such as a chloride is used for antistatic treatment in order to improve the performance characteristics of the faceplate of a Braun tube, there cannot be obtained a coating composition which is satisfactory enough with respect to not only the formation of a coating film having very small concavities and convexities, antistatic properties and non-glare properties but also the performance characteristics of the coating film, such as resistance to corrosion and prevention of emissions slump.

On the other hand, in the present invention, the employment of the aqueous-dispersion type sol of the electrically conductive oxide(s) in place of the above-mentioned water-soluble metal compound brings about the following excellent results: the transparency of a coated surface is improved, no deterioration in resolution is caused, no glare is generated, and a resistivity value of $10^8$ $\Omega$ or less is attained.

What is claimed is:

1. An antistatic coating composition comprising a mixed aqueous-dispersion sol, said coating composition consisting essentially of
    (i) an aqueous-dispersion sol of an electrically conductive oxide(s) of at least one metal selected from the group consisting of tin, antimony and indium, and
    (ii) an aqueous silica sol prepared by dispersing or hydrolyzing lithium silicate and/or alkyl silicate in water solvent, wherein the proportion of metal oxide(s) is approximately 10 to 200 parts by weight per 100 parts by weight of silicon obtainable from the aqueous silica sol.

2. A coating composition according to claim 1, wherein the electroconductive metal oxide is one which has a particle size of 1 μm or less.

3. A coating composition according to claim 1, wherein the hydrolysis to prepare the silica sol is carried out under the presence of no catalyst, a basic catalyst or an acidic catalyst.

4. A coating composition according to claim 1, wherein the proportion of metal oxide(s) is approximately 15 to 100 parts by weight per 100 parts by weight of silica obtainable from the aqueous silica sol.

* * * * *